April 3, 1951   W. A. McCOOL   2,547,650
CONDUCTANCE METER
Filed Oct. 12, 1948

Inventor:
William A. McCool,
by
Pierce, Scheffler & Parker
Attorneys.

Patented Apr. 3, 1951  2,547,650

UNITED STATES PATENT OFFICE 2,547,650

CONDUCTANCE METER

William A. McCool, Hyattsville, Md., assignor to Boonton Radio Corporation, Boonton, N. J., a corporation of New Jersey Application October 12, 1948, Serial No. 54,118

7 Claims. (Cl. 175—183)

This invention relates to a radio frequency impedance measuring device, and more particularly to a device for measuring both the conductive and susceptive components of a specimen by substitution methods. The specimens may be resistors, inductors, choke coils, transmission lines, radio frequency transformers, capacitors or insulating materials arranged between metal electrodes, or entire radio frequency circuits.

For convenience of description, the device will be termed a conductance meter because of the facility with which it may be employed for the measurement of conductance.

The prior measuring techniques for evaluating the radio frequency loss characteristics of high quality insulating material did not afford high accuracy with rapid and simple methods, and with relatively inexpensive equipment. For example, the round-robin testing of a group of typical ceramic insulating materials by thirteen testing agencies showed differences of as much as 11% in the dry power factor measurements of different agencies even though the specimen material was not of the exceptionally low-loss variety. In general, the accuracy of measurements by the known methods and equipment has decreased with decreases in power factor or conductance, and with increases in the radio frequencies at which the measurements were made.

Objects of the present invention are to provide radio frequency impedance measuring devices which afford high accuracy of measurement of low conductance values at high radio frequencies and, if desired, at different radio frequencies; which are characterized by simple and rapid operational methods; and which are of relatively simple and inexpensive construction. An object is to provide impedance measuring devices which are stable in operation and retain their initial calibration over long periods of use. An object is to provide impedance measuring devices operating on the resonant rise principle which afford direct or substantially direct readings, by substitution methods, of the conductive and susceptive components of test specimens. A further object is to provide impedance measuring devices in which the calibrated and adjustable standard of conductance takes the form of a diode in series with an adjustable direct current resistance.

These and other objects and the advantages of the invention will be apparent from the following specification when taken with the accompanying drawing in which.

Figure 1:
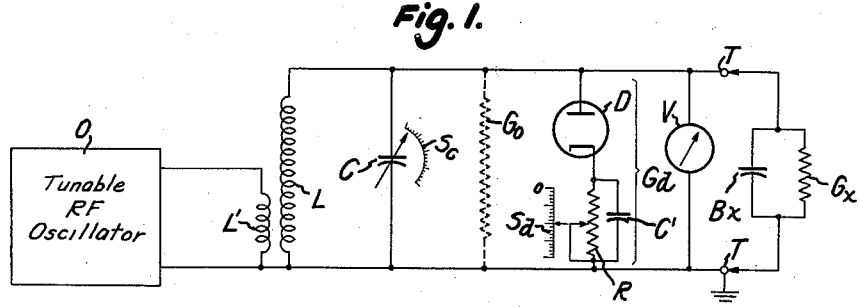
Fig. 1 is a simplified and schematic diagram of the basic circuit of a conductance meter embodying the invention.

In Fig. 1, the basic measuring circuit is shown as comprising a tunable circuit, provided by an inductor L and an adjustable capacitor C, across which a diode D and an adjustable resistor R are connected in series, the resistor being shunted by a radio frequency by-pass condenser C'. As shown schematically, the resistor R is preferably a potentiometer connected between ground and the cathode of diode D, the sliding tap of the potentiometer being grounded. The potentiometer shaft carries a graduated dial or, as indicated schematically, a pointer cooperating with a scale $S_d$ graduated in conductance values, the zero scale graduation corresponding to maximum conductance of the series diode circuit, i. e. to adjustment of the potentiometer tap to by-pass a preselected portion of the potentiometer resistance. The graduations of scale $S_d$ thus represent changes in the conductance of the diode circuit as the ohmic resistance of the resistor R is increased to its maximum value from its preselected minimum value established by the allowable loading of the measuring circuit. The tuning condenser C is provided with a scale $S_c$ graduated in values of capacitance. The measuring circuit is energized by an oscillator O which, as shown schematically, may be tunable over a frequency range, through any desired type of coupling such as, for example, a coil L' coupled to the coil L of the measuring circuit. The particular type of the oscillator O is not important but it should be of a known type which is self-regulated to deliver a highly stabilized output voltage or current. Terminals T, T are connected to the opposite ends of the tunable circuit L, C, and a test specimen having conductive component $G_x$ and a susceptive component $B_x$ may be connected across these test terminals. The total circuit losses, exclusive of the diode circuit, are lumped and indicated schematically as a conductance $G_o$ in shunt with the tuned circuit L, C, but it is not necessary to determine the value $G_o$ since the value $G_x$ of a test specimen is determined by a substitution method which is independent of the total measuring circuit parameters. A vacuum tube voltmeter V is shunted across the tunable circuit L, C to afford an indication of the resonance or off-resonance condition of the circuit as condenser C is adjusted.

The circuit is conditioned for a measurement, before the test specimen is connected across terminals T, T, by adjusting the conductance of the diode circuit to its maximum value, i. e. by adjusting the potentiometer resistor R to its selected minimum value. This corresponds to a zero conductance reading on the graduated scale $S_d$. The condenser C is then adjusted for resonance, i. e. to obtain a maximum reading at voltmeter V. This voltage reading is noted, and the test specimen is then connected across terminals T, T.

The voltage across the circuit L, C is thereby altered since the susceptive component $B_x$ of the test specimen shifts the resonant frequency of the tuned circuit L, C to a new value, and the conductance $G_x$ alters the load across the tuned circuit. Condenser C is adjusted to obtain a new maximum voltage indication at voltmeter V, and the change in capacitance as read from the scale $S_c$ determines the susceptance $B_x$ of the test specimen. The potentiometer resistance R is then adjusted to obtain the previously-noted voltage reading at voltmeter V, thereby reducing the effective conductance $G_d$ by an amount equal to the conductance $G_x$ of the test specimen.

In other words, the measuring circuit is again in resonance as the capacitance of tuning condenser C has been reduced by the increment $B_x$ contributed by the test specimen, and the total conductance across the tuned circuit has been reduced to its initial value by subtracting from conductance $G_d$ the increment added by the test specimen. The scale $S_d$ is calibrated to read directly in values of the changes in the total radio frequency conductance of the diode circuit as a function of the changes in the direct current resistance of potentiometer R.

Figure 2:
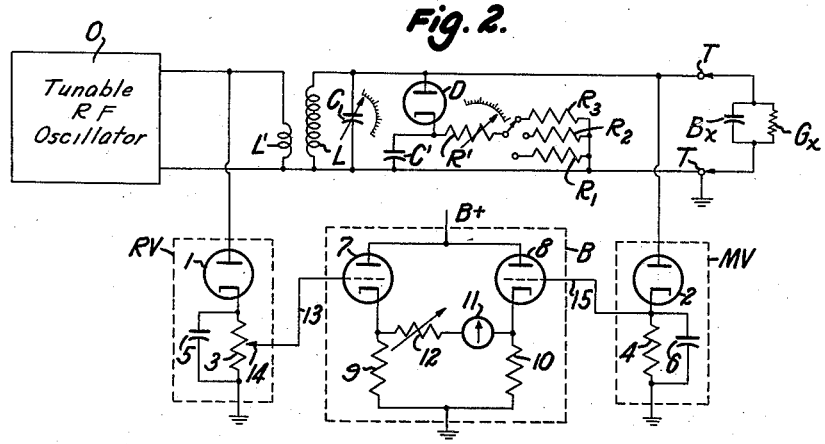
Fig. 2 is a circuit diagram of a multirange conductance meter.

The voltage change developed across the measuring circuit by specimens of low conductance is too small to permit an accurate resetting of even a vacuum tube type of voltmeter V to a previously obtained reading and, for high sensitivity, a balanced vacuum tube voltmeter circuit as shown in Fig. 2 is employed. The Fig. 2 circuit also differs from the basic circuit of Fig. 1 in that provision is made for measuring conductance values in a plurality of ranges. Such elements of the Fig. 2 circuit as are, or may be, identical with elements of the Fig. 1 circuit are identified by like reference characters but will not be described in detail.

For multirange measurements, the single adjustable resistor R of the Fig. 1 circuit is here replaced by an adjustable potentiometer resistance R' and a bank of fixed resistors $R_1$, $R_2$, $R_3$ of different values, any one of which may be connected in series with adjustable resistor R' by means of a range change switch S.

The voltage balance system for obtaining an accurate indication of the resonance condition of the measuring circuit LC includes a voltage rectifier circuit in broken line rectangle RV for deriving an adjustable direct current voltage from the oscillator O, a similar voltage rectifier circuit in broken line rectangle MV for rectifying the alternating current voltage across the measuring circuit, and an amplitude balance indicator in broken line rectangle B upon which direct current voltages from both rectifiers are impressed in opposition. The rectifier circuits RV and MV are preferably of substantially identical construction with diodes 1, 2, respectively, which are connected to ground through cathode resistors 3, 4 which are by-passed for radio frequency by condensers 5, 6, respectively. The balance indicator B includes a pair of amplifier tubes 7, 8 with cathode resistors 9, 10, respectively, and a microammeter 11 connected across the cathodes in series with an adjustable sensitivity-control resistor 12.

The grid of tube 7 is connected by lead 13 to an adjustable tap 14 on cathode resistor 9 of diode 1, and the grid of tube 8 is connected by lead 15 to the cathode of the diode 2. The microammeter 11 is of the zero center type and the voltages developed across cathode resistors 9 and 10 tend to deflect the instrument pointer in opposite directions.

The Fig. 2 circuit is conditioned for a conductance measurement by adjusting resistance 12 to its maximum value (minimum sensitivity of instrument 11) for protective purposes, adjusting resistance R' to its minimum value, and then adjusting condenser C to obtain a maximum deflection of the instrument pointer in the sense corresponding to increased voltages on the measuring voltage diode 2. The tap 14 is then adjusted along the reference voltage resistor 3 to set the pointer of instrument 11 to its zero position. During this balancing step, the sensitivity control resistor 12 is progressively reduced in effective value to increase the instrument sensitivity, thereby affording a high resolution of the final conductance evaluation. These adjustments afford a highly accurate balance of the voltage across the measuring circuit, at resonance, against an equal reference voltage derived from the oscillator O.

The resistor 12 is again set for low instrument sensitivity, the test specimen is connected across the terminals T, T, and condenser C is adjusted to resonate the measuring circuit again, i. e. is adjusted to effect a maximum displacement of the pointer of instrument 11 from its zero position as the sensitivity of the instrument is progressively increased by adjustment of resistor 12. This change in the capacitance is noted as the value of the susceptance $B_x$ of the test specimen. The resistance R' in the cathode circuit of diode D is then adjusted to reset the instrument pointer to its initial zero position, and the change in diode circuit conductance due to the change in value of resistance R', as indicated on conductance scale $S_d$, is equal to the conductance of the test specimen.

The particular measuring ranges which are obtained with an embodiment of the invention as illustrated in Fig. 2 depend upon the range of adjustment of the resistance or conductance values of the several series cathode circuits of the diode D. The number of and the relative values of the fixed resistors of the cathode circuit of diode D may be so selected as to afford conductance measurements in a plurality of overlapping ranges. For simplicity in illustration only three fixed resistors which afford conductance measurements in spaced ranges are illustrated.

Figure 3:
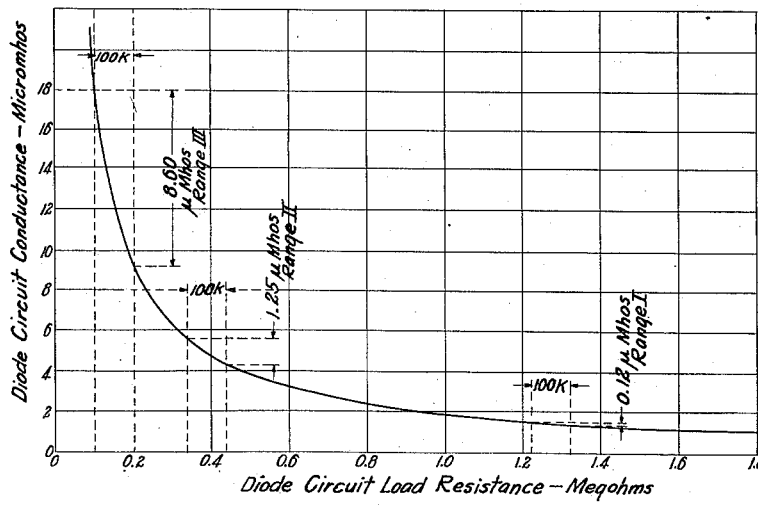
Fig. 3 is a curve sheet showing the several conductance measuring ranges for a particular embodiment of the invention.

In a practical constructional embodiment of the invention, in which diode D was a tube of the 6H6 type, the values of the cathode resistors of the tube D were:

R'=0 to 100 kilohms
$R_1$=1.22 megohms, range I
$R_2$=335 kilohms, range II
$R_3$=100 kilohms, range III The several conductance measuring ranges for these resistance values are shown graphically by curve A of Fig. 3 which is plotted between values of direct current load resistance of the diode D and corresponding changes in diode circuit conductance due to variation, in each measuring range of resistor R' from zero to 100,000 ohms.

As above described, the sequence of steps in determining the conductance of a test specimen or circuit is to resonate the measuring circuit and balance the meter 11 at zero with the test specimen disconnected, the range switch S set for the desired range, and the potentiometer R' set for minimum resistance (maximum loading or maximum conductance). The test specimen or circuit is then connected across terminals T, T, the measuring circuit is resonated, and a conductance equal to the conductance $G_x$ of the test specimen or circuit is removed from the measuring circuit by increasing the diode load resistance, by means of potentiometer R', to rebalance the meter 11 at zero. An alternative method of calibration and use of the apparatus is to resonate the measuring circuit and balance the meter 11 at zero with the test specimen connected across the terminals T, T, and with the diode conductance at a minimum value (maximum diode load resistance). The test specimen will then be removed and conductance added, by increasing the effective value of potentiometer R' until balance is again attained.

It is to be understood that the invention is not limited to the particular circuit herein illustrated and described, or to specified values of circuit elements employed in one practical embodiment of the invention, and that various changes in circuit arrangement and relative values of circuit elements fall within the spirit and scope of the invention as set forth in the following claims.

I claim:

1. In a device for measuring radio frequency impedance, a tunable radio frequency circuit comprising an inductor and a tuning capacitor in parallel, a source of radio frequency energy coupled to said radio frequency circuit, an adjustable conductance connected across said radio frequency circuit and comprising a diode in series with resistance means of adjustable magnitude, a radio frequency capacitance bypassing said resistance means, indicating means responsive to the radio frequency voltage across said radio frequency circuit, a pair of measuring terminals connected to the opposite ends of said radio frequency circuit, and a scale adjacent said resistance means calibrated in values of change in the total radio frequency conductance of said diode and resistance means with changes in the magnitude of said resistance means.

2. In a device for measuring radio frequency impedance, the invention as recited in claim 1, wherein said indicating means includes means for rectifying the radio frequency voltage across the radio frequency circuit, and a direct current instrument responsive to variations in the magnitude of the rectified voltage.

3. In a device for measuring radio frequency impedance, the invention as recited in claim 1, wherein said indicating means includes an electronic comparator circuit, and means for impressing upon said comparator circuit in opposition a direct current voltage varying in magnitude with the radio frequency voltage across said radio frequency circuit and a direct current voltage of adjustable magnitude derived from said source of radio frequency energy.

4. In a device for measuring radio frequency impedance, the invention as recited in claim 1, wherein said indicating means includes an electronic comparator circuit comprising a pair of vacuum tubes each having a control grid and plate cooperating with a cathode, load impedances connected between the plate and cathode of the respective tubes, a direct current measuring instrument connected between said load impedances, means including a rectifier connected across said radio frequency circuit for impressing upon the grid of one tube a direct current voltage varying with the radio frequency voltage across said radio frequency circuit, and means for impressing upon the grid of the other tube a direct current voltage of adjustable magnitude.

5. In a device for measuring radio frequency impedance, the invention as recited in claim 4, in combination with means for adjusting the sensitivity of said direct current measuring instrument.

6. In a device for measuring radio frequency impedance, the invention as recited in claim 4, wherein said last means includes a rectifier circuit connected across said source of radio frequency energy, a resistor in said rectifier circuit, and a tap adjustable along said resistor and connected to the grid of said other tube.

7. In a device for measuring radio frequency impedance, the invention as recited in claim 1, wherein said resistance means includes a resistor of adjustable magnitude, a plurality of fixed resistors of different magnitudes, and switch means for connecting said resistor of adjustable magnitude in series with a desired one of said fixed resistors.

WILLIAM A. McCOOL.

REFERENCES CITED

The following references are of record in the file of this patent:

UNITED STATES PATENTS

| Number | Name | Date |
|---|---|---|
| 1,789,369 | Meissner | Jan. 20, 1931 |
| 2,043,241 | Eyer | June 9, 1936 |
| 2,071,607 | Bjorndal | Feb. 23, 1937 |